July 9, 1974 V. M. CHONG 3,823,014
SODIUM RECOVERY PROCESS
Filed Feb. 9, 1973
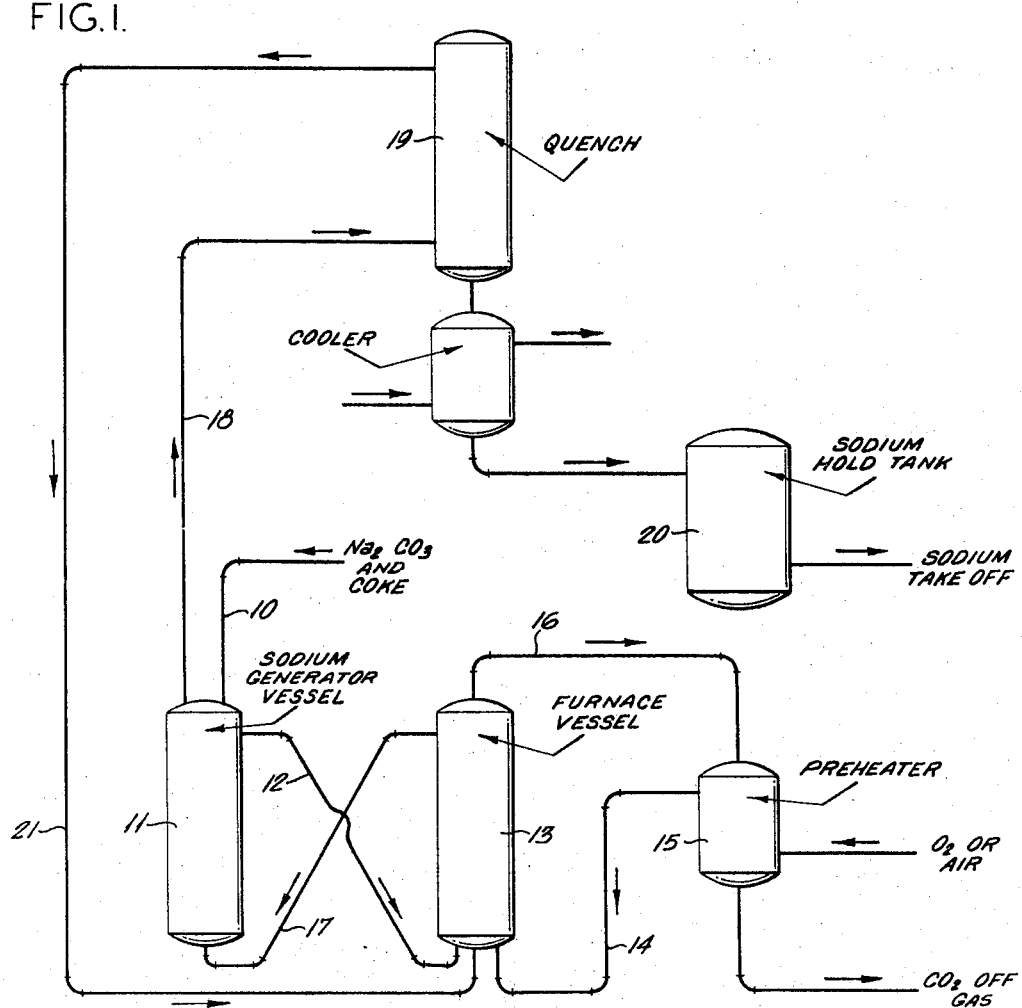
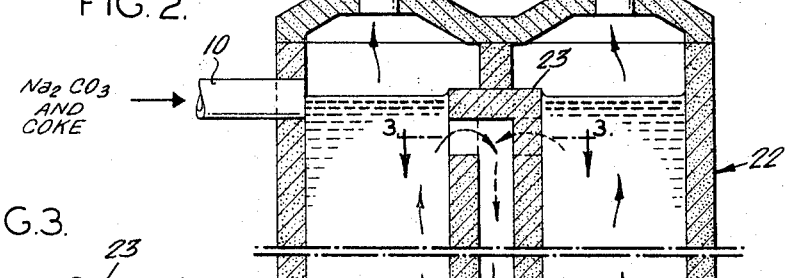
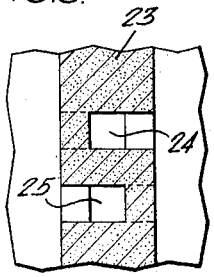
INVENTOR:
VICTOR MANUEL CHONG
BY Paul Lipsitz
AGENT United States Patent Office 3,823,014
Patented July 9, 1974

3,823,014
SODIUM RECOVERY PROCESS
Victor Manuel Chong, Media, Pa., assignor to Sun Research and Development Co., St. Davids, Pa.
Continuation-in-part of abandoned application Ser. No. 177,270, Sept. 2, 1971. This application Feb. 9, 1973, Ser. No. 330,929
Int. Cl. C22b 27/00
U.S. Cl. 75—66                                 3 Claims

ABSTRACT OF THE DISCLOSURE

A thermal process for the generation of sodium metal from sodium carbonate and coke by feeding particulate coke and sodium carbonate to a sodium generator, conducting molten sodium carbonate containing unreacted coke by gravity flow from the upper portion of the generator to the bottom of a furnace, said furnace being fed with a source of oxygen to obtain essentially complete combustion of the coke, recirculating the molten sodium carbonate by gravity flow from an upper portion of the furnace to the bottom of the generator, conducting vapors of carbon monoxide and sodium from the generator to a quench system, recovering condensed liquid sodium from the bottom of the quench system, the carbon monoxide exiting from the quench system being returned to the furnace for combustion to carbon dioxide.

RELATED APPLICATION

This application is a continuation-in-part of Ser. No. 177,270, filed Sept. 2, 1971 and now abandoned.

The thermal reduction of sodium carbonate with coke or other carbon sources is well known. The process suffers from several problems, however, which have hampered commercial development. One of these problems concerns the heat generation and heat transfer required by the endothermic reaction.

It is known from the disclosure of U.S. 2,930,689 (S. C. McGriff, issued Mar. 29, 1960) that molten sodium carbonate and coke or other carbonaceous material may be reacted to form metallic sodium in a reaction system where the molten carbonate at the top portion of a heating chamber flows over a weir into the top portion of a chamber to contact a carbonaceous reductant, vapors of sodium being taken from the enclosed reactor and the molten sodium carbonate circulated back laterally from the bottom of the sodium generating chamber to the bottom of the heating chamber by virtue of the pumping action of the combustion gases. However, the McGriff system has an inherent problem in that the flow of molten carbonate is not satisfactory. This poor flow problem arises because bubbles formed by the gases of combustion and reaction occur in both chambers and the rising of these bubbles impede the smooth flow of molten sodium carbonate from the sodium generator section to the heating section. The formation of these bubbles is recognized by McGriff (column 4, lines 18 to 33) where he discusses this bubble formation and some of its complications, concluding that it does not present a serious contamination problem. But these bubbles do cause a flow problem which must be overcome if such a process is to be a commercial reality.

The process of this invention effectively overcomes the above-mentioned heat problems and the flow problems characteristic of the above-described prior art. The process of this invention also makes maximum efficient use of energy by burning all carbon present to carbon dioxide instead of only the usual carbon monoxide or carbon monoxide-carbon dioxide mixture usually obtained in processes used heretofore. Other advantages of the process will become apparent from the following detailed description.

The invention provides a thermal process for the generation of sodium metal from sodium carbonate and coke which comprises feeding particulate coke and sodium carbonate to a sodium generator vessel, conducting molten sodium carbonate containing unreacted coke by gravity flow through a conduit from the upper portion of said generator to the bottom of a furnace, said furnace being fed with an oxygen containing gas to obtain essentially complete combustion of said coke, recirculating the molten sodium carbonate by gravity flow through a conduit from an upper portion of said furnace vessel to the bottom of said generator vessel, conducting vapors of carbon monoxide and sodium from said generator vessel to a quench system, recovering condensed liquid sodium from the bottom of said quench system, and said carbon monoxide gas being taken from said quench system and introduced to said furnace vessel for combustion to carbon dioxide.

In the drawings
FIG. 1 shows a flow diagram of the process;
FIG. 2 is an embodiment of the invention where the sodium generator vessel and the furnace vessel are made part of a single compartment;
FIG. 3 is a section view of FIG. 2.

In order to more fully describe the invention, reference is now made to FIG. 1 of the drawing. A mixture of particulate sodium carbonate and coke is fed into the system at line 10 and then into a sodium generator vessel 11. This sodium generator is maintained at about 2200° F. to 2300° F. and here sodium is generated in accord with the following equation:

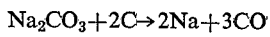

$$Na_2CO_3 + 2C \rightarrow 2Na + 3CO$$

The sodium carbonate in generator 11 is molten and is circulated from bottom to top of the generator by the upward flow of CO and sodium vapor. From the top of generator 11, molten sodium carbonate and entrained coke flow by gravity through line 12 to the bottom portion of a furnace vessel 13, which is held at about 2700° F. Oxygen, air or other source of oxygen is introduced into the bottom of the furnace 13 through line 14 to completely burn entrained coke (plus CO from the quench 19) to $CO_2$. A heat exchanger 15 may be used to preheat the oxygen input with the $CO_2$-containing furnace off-gases vented through line 16. The energy released by coke-CO combustion in furnace 13 is absorbed by the molten sodium carbonate, which is circulated from the bottom to the top of the furnace by the upward flow of gaseous combustion products. It will be understood that only part of the coke is used for the actual chemical reaction (0.52 lb. coke/lb. Na produced, stoichiometric). The rest of the coke (0.18 lb. if no losses) is burned for heat. At least part of this latter portion may be replaced by some other fuel fed directly to furnace 13. From the top portion of furnace 13, the molten carbonate flows by gravity through line 17 to the bottom portion of the sodium generator 11. Since the bulk of material in the generator 11 will be aerated with CO and sodium vapor, the average density of this material will be less than that of the substantially non-aerated molten carbonate in line 17. Likewise, since the bulk of material in the furnace 13 is aerated with combustion product gases, the average density of this material will be less than the substantially non-aerated material in line 12. These density differences cause the top-to-bottom gravity flow between generator 11 and furnace 13. It is to be expected that some aeration will occur in the lines, especially in line 12 where coke could react with $Na_2CO_3$ to form sodium and CO vapors. However, this aeration will not be enough to inhibit flow since line 12 will be relatively cold compared to the bottom of the generator 11, where the bulk of sodium and CO are formed. No pumping equipment need be used in this circulating system and this makes for a more economical and efficient process devoid of maintenance problems which would result from the highly corrosive action of the sodium carbonate melt.

It is to be understood that an essential feature of the process is the gravity feed system whereby molten sodium carbonate flows from the top of the sodium generator vessel through a conduit to the bottom of the furnace vessel and also flows from the top of the furnace vessel through a conduit back to the bottom of the generator vessel. It is this top-to-bottom flow and not a lateral flow which makes the process free of flow problems.

Because of the corrosive nature of the sodium carbonate, however, it is necessary to select materials of construction which have adequate resistance and a preferred material is fused-cast alumina, which is commercially available for construction purposes in a variety of standard forms and sizes made to specification.

The metallic sodium vapors generated in the generator 11 are taken overhead together with the carbon monoxide vapors produced in accord with the above equation through line 18 to a quench system 19 where the sodium is cooled and condensed to liquid metal which may be stored in a hold tank 20 from which it is recovered. Alternatively, the condensed sodium may be vaporized with waste heat from furnace 13 for direct chemical use or heat transfer purposes, such as in a process for desulfurization of residual oil. In any event, the CO separated from the sodium is recycled through line 21 to furnace vessel 13 where it is completely oxidized to $CO_2$. The recycling and combustion of the CO vapors in combination with the sodium generation system make the process of this invention a highly efficient, practical process.

It will be understood that the gravity-flow sodium generator-coke burning furnace system described above may be modified in order to achieve the objects of the invention. Shown in FIG. 2 is a modified system involving a compartmentalized single vessel which offers the advantages of lower construction costs. As shown in FIG. 2, sodium carbonate and coke enter at the top of one side of the vessel 22. The vessel is divided by a conduit wall construction which is conveniently built of fused-cast alumina brick. Such fused-cast alumina brick is available under the trademark "Monofrax A," describing refractories of this type made by the Carborundum Company. Conduits 24 and 25 built into the dividing wall connect the top of one side to the bottom of the other side and permit flow of the molten material as shown by the arrows. FIG. 3 is a fragmentary sectional view taken on the line 3—3 of FIG. 2 showing the conduits 24 and 25. It will be understood further that this construction also may be modified in various ways, as for example, by having multiple connecting conduits, baffles, and the like.

It is also to be understood that the amount of reactants introduced into the system and the amount of products removed from the system will vary in accord with design features. The minimum amount of coke required for both the chemical stoichiometry and the heat of reaction is about 0.7 pounds per pound of sodium produced. However, because of mechanical, chemical and thermal losses more than this amount of coke will be employed. As a guide in starting up the process about 0.5 part by weight of coke per part of sodium carbonate will be employed and then adjustments may be made as the overall efficiency of the particular system is determined. As a further illustration of a working system using the technique described by FIG. 1, a feed of 1.1 pounds of coke, 2.31 pounds of sodium carbonate and 2.59 pounds of oxygen produce 1 pound of sodium and 5 pounds of $CO_2$ products.

The process of the invention overcomes the flow problems of the prior art and the difficult heat transfer problems associated with the coke-sodium carbonate method for recovering sodium and thus makes a valuable contribution to the art.

The invention claimed is:

1. A thermal process for the generation of sodium metal from sodium carbonate and coke having improved heat transfer which comprises feeding particulate coke and sodium carbonate to a sodium generator maintained at about 2200° F. to about 2300° F., conducting molten sodium carbonate containing unreacted coke by gravity flow through a conduit from the upper portion of the generator to the bottom of a furnace held at about 2700° F., said furnace being a separate chamber fed with oxygen to obtain essentially complete combustion of the coke to carbon dioxide, recirculating the molten sodium carbonate by gravity flow through a conduit from an upper portion of the furnace to the bottom of the generator, conducting vapors of carbon monoxide and sodium from the generator to a quench system recovering condensed liquid sodium from the bottom of the quench system, the carbon monoxide exiting from the quench system being returned to the furnace for combustion to carbon dioxide to provide heat to said molten sodium carbonate.

2. A process as in Claim 1 where the sodium generator and the furnace are separate vessels.

3. A process as in Claim 1 where the sodium generator and the furnace are combined in a compartmentalized single vessel.

References Cited

UNITED STATES PATENTS 2,721,813  10/1955  Holmberg _____ 75—63 X
2,930,689   3/1960  McGriff _____ 75—66

L. DEWAYNE RUTLEDGE, Primary Examiner

M. J. ANDREWS, Assistant Examiner